United States Patent [19]

Mathieu

[11] 3,879,133

[45] Apr. 22, 1975

[54] METHOD AND APPARATUS FOR COMPARING TWO OBJECTS HAVING SIMILAR SHAPES AND DIMENSIONS

[75] Inventor: Ernst Mathieu, Aulnay-Sous-Bois, France

[73] Assignee: Compagnie Electro-Mecanique, Paris, France

[22] Filed: Dec. 20, 1973

[21] Appl. No.: 426,436

[30] Foreign Application Priority Data

Dec. 21, 1972 France .............................. 72.45722

[52] U.S. Cl. ................ 356/168; 356/156; 356/162; 356/169; 356/171; 178/DIG. 36

[51] Int. Cl. .......................................... G01b 11/24

[58] Field of Search ........... 356/156, 162, 168, 169, 356/171, 2; 178/DIG. 36; 250/237 G

[56] References Cited

UNITED STATES PATENTS

| | | | |
|---|---|---|---|
| 3,546,377 | 12/1970 | Troll | 356/168 X |
| 3,619,064 | 11/1971 | Brooks | 356/156 X |
| 3,663,107 | 5/1972 | Denis et al. | 250/237 G |
| 3,814,521 | 6/1974 | Free | 356/156 |

*Primary Examiner*—Ronald L. Wibert
*Assistant Examiner*—Paul K. Godwin
*Attorney, Agent, or Firm*—Pierce, Scheffler & Parker

[57] ABSTRACT

A method and apparatus for comparing two objects having similar shapes and dimensions wherein one of the objects is illuminated by a collimated light beam whose intensity is modulated in a direction transverse thereto at a spatial frequency $1/p$. The modulated light beam generates a lattice of alternately dark and light parallel bands similar to interference fringes having a pitch p on the illuminated surface of the object having a configuration in the manner of contour lines determined by the relief of the illuminated side of the object. The other object is thereafter substituted for the first one and in the same position, and is similarly illuminated by the same beam but wherein the intensity modulation has been phase-shifted by 180°. The respective images of the two objects are optically superimposed and from which is then obtained only the differential component of the image which is modulated with a spatial frequency $1/p$.

Apparatus for carrying out the method can be either (1) photographic in which case the superimposed images of the two objects are established by development on a photo-sensitive negative which is light-transmissive in conjunction with a lens which transmits only the differential component in the negative to a photographic plate, or (2) electronically by means of a TV camera and related components by which the respective video images are added and passed to a visual display device such as a cathode ray tube via a filter having a pass band transmitting only the differential signal component which is modulated by the time frequency $v/p$ wherein $v$ constitutes the linear sweep speed of the TV camera.

5 Claims, 6 Drawing Figures

METHOD AND APPARATUS FOR COMPARING TWO OBJECTS HAVING SIMILAR SHAPES AND DIMENSIONS

The present invention relates to a process and to an apparatus for comparing two objects closely related in shape and dimensions.

A process of a similar kind already is known, which consists essentially in super-posing images of the objects to be compared, in causing two light beams respectively emanating from each object to converge on a single image detector, the intensity of said beams being modulated in the same transverse direction and being of identical spatial period $p$ but out of phase by 180°, filtering being used to extract the differential component which is modulated by a spatial frequency $1/p$, and said differential component being visually displayed. As regards this known process, the two object images are formed by spatially modulating the respective intensities of the light beam emitted from the objects, by traversing a plane grid located behind the objective of a camera and against the photosensitive plate with which latter is loaded and on which the two object images are recorded by superposition.

This known process mounts to modulate the superposed image of the two objects recorded in the photographic plate by the spatial frequency $1/p$, the plate being two-dimensional whereas the compared objects generally are three-dimensional. This visually displayed modulation of the differential image therefore cannot provide any information concerning the directions normal to the photographic plate (differences in relief). Thus this known process only allows comparing object dimensions in two directions; in order to compare the objects in the third, the comparison must be repeated following rotation of the objects in such manner as to position their third dimension essentially parallel to the photographic plate.

The process of the present invention allows comparison, in a single operation, of the shapes and dimensions of two three-dimensional objects.

The process of the present invention also consists essentially in superposing the images of two objects being compared, in causing two light beams respectively emanating from the two objects to converge on the same detector, said light beam intensities being each modulated at least in the same transverse direction and with the same spatial frequency $1/p$ but 180° out of phase, the differential component of the superposed image being extracted by means of a filter and being modulated by the spatial frequency $1/p$, said differential component being visually displayed, and being characterized in that the two object images are formed by illuminating each object with a different light beam of different intensity at least with respect to said transverse direction, of said spatial period $p$ and out of phase by 180°.

If for instance the intensities of the illuminating light beam vary in one or two transverse directions, a unidimensional network of alternately dark and light bands will appear, or else a two-dimensional network or lattice of alternately dark and light spots, which will be superposed to the image of each object formed by the process of this invention, the structure of said network, that is, notably the configuration of its parallel bands or the shape and array of its spots, being influenced by the structure of the corresponding object to the extend latter's illuminated surface will not be truly plane, that is, to the extent it is endowed with relief. If the reliefs of the two objects are not rigorously identical, this will be shown to the same extent in the network structures of bands and spots that appear superposed to their images, these themselves being superposed, so that local differences in relief between the two objects are rendered on their superposed images obtained from the process of this invention by moire phenomena due to the superposition of two band or spot networks with slight local shifts. It is these moire phenomena which provide additional information and indicate structural differences between the two objects being compared along their third dimension, whereas the differential image proper provides information about their structural differences in the other two dimensions. Therefore the process of the present invention allows conclusions as to the identities of two objects compared in all three dimensions. For identity of the two objects simultaneous absence of differential image and of moire patterns occurs.

From the structural differences in the two band or spot networks or lattices which show up superposed to the differential image, the zones with relief differences and also the size of the differences in the two compared objects may be easily inferred if use is made of the width of the periodic bands or spots as a standard, said width being easily determinable; obviously, the accuracy of such determination will be the higher, the finer the structure of the band or spot lattice, that is, the lesser the value of the spatial period $p$. Clearly the same standard may also be used to analyze the size of the zones of the two objects being compared in which latter differ in structure in the other two dimensions and corresponding to the differential image proper.

The process of the present invention lends itself to numerous applications, for instance comparing mass-produced line objects with a standard object, or periodic monitoring of shape and dimensions of a part susceptible to wear or deterioration, or comparison of one part at one production stage with another part of another production stage, etc.

As regards a preferred embodiment of the process of the invention, a single light beam is used, which may be phase-modified by 180° with respect to spatial, periodic and intensity variations in order to consecutively illuminate the first and second of the objects being compared, the first object being stored at least until it may be superposed on the second one. The memory used to this end may be either an optical kind such as a photographic plate or roll, or an electrical type as explained in further detail below; it is to be understood that with such an electric storing of the image of the standard object, the process of the invention will allow continuous monitoring and controlling the characteristics of shape and dimensions of, say, line-produced objects as they arrive at the end of the production line, that is, this may be done in real time, which cannot be done by photography.

This preferred embodiment or mode of the process besides allowing use of a single light beam also provides the following additional advantage: the position of the first object may be located or indexed for instance with respect to the dark bands that the light beam causes to appear on the first object, the second object's position then being determined with respect to the light bands caused by said light beam after its spatial intensity variation phase has been shifted by 180° in order to simultaneously illuminate the two objects being compared; this illumination can be used for adjusting the two objects with respect to one another in such positions that their images will precisely superpose.

The present invention also applies to different embodiments of an apparatus for implementing the previously defined process. One advantageous embodiment of the apparatus of the present invention comprises a single illuminating light beam source used to illuminate consecutively the two objects being compared, said source comprising two point-sources each generating a monochromatic light beam coherent with the other, means causing the two beams to converge in such manner that the illuminated object is located in their interference field causing periodic interference fringes on the object, means for shifting one of the light beams from the point-sources by 180° at will, a TV camera with a linear sweep speed $v$, means for storing electric video signals from said camera when picking up the first object, means for adding the stored video signals to those obtained from the said camera when picking up the second object, and means for obtaining the components from their sum by means of a filter, said components being modulated by the time-frequency $v/p$, and for transmitting these components in the form of a video signal to a visual display device.

Several embodiments implementing the process of the present invention are illustratively and schematically shown in the attached drawings and described below:

Figure 4:
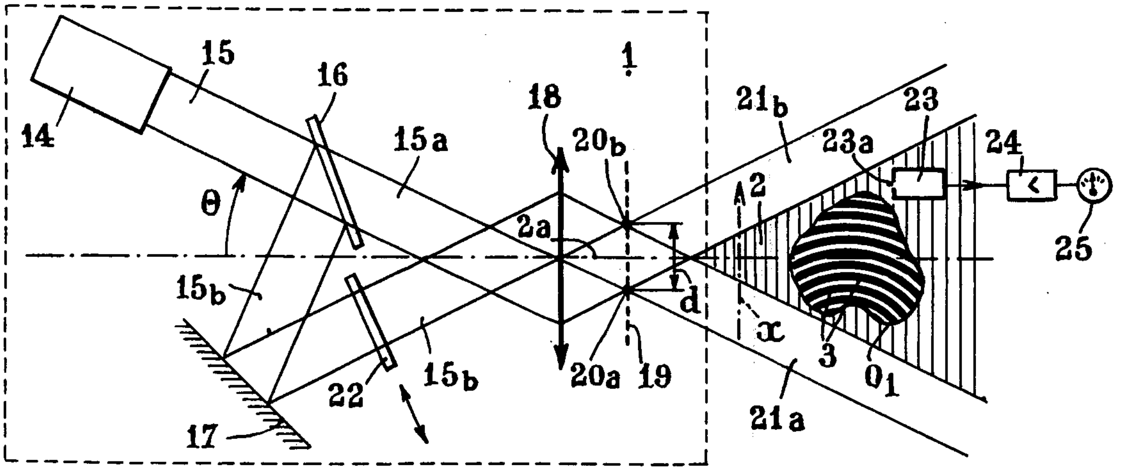
FIG. 4 is a schematic illustration of one embodiment of the light beam source of FIG. 1.
Figure 5:
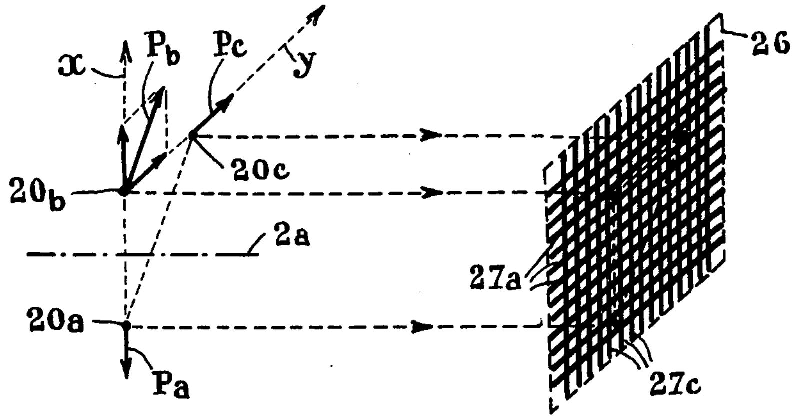
Figure 6:
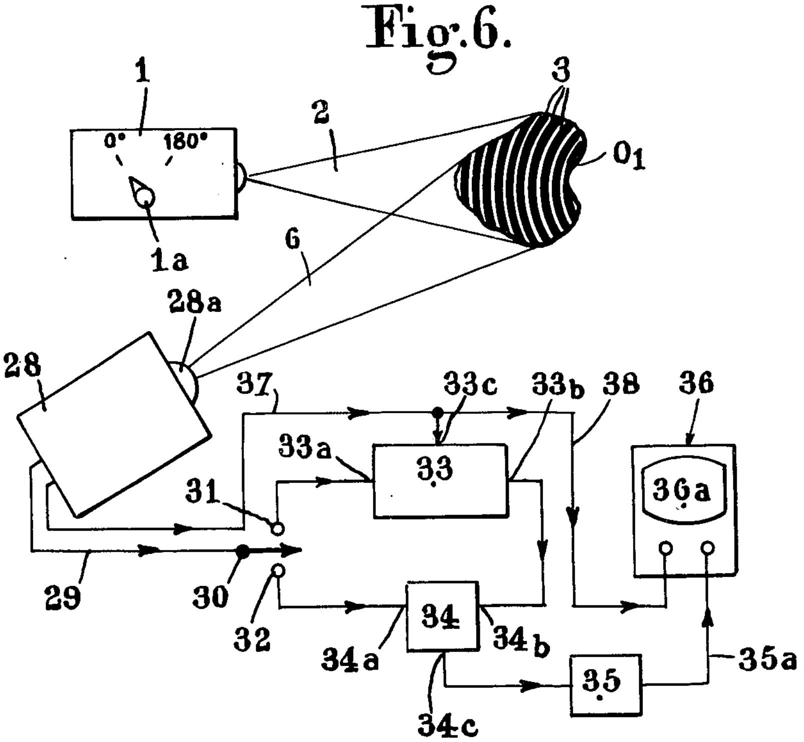

FIG. 5 schematically illustrates a variation of the light beam source of FIG. 4;

FIG. 6 schematically illustrates a second embodiment of the apparatus of the present invention.

Reference $O_1$ in FIG. 1 denotes a three-dimensional first object to be compared with a second object of closely-related shape and dimensions, not shown in FIG. 1, but which subsequently will be denoted by $O_2$. Reference numeral 1 denotes a generator or source providing a light beam 2 illuminating object $O_1$; two embodiments will be described for this generator 1 further below and in detail; said generator in conformity with the invention offers the following characteristics; its intensity varies as a function of the spatial period $p$ which is precisely defined in a direction $x$ transverse to said beam 2, that is, latter will generate a lattice of parallel, straight, alternately dark and light bands similar to interference fringes, of pitch or denier p and independent of the screen position if the beam is collimated, where said illustrative screen is located in a plane normal to the axis $2a$ of beam 2 pointing towards object $O_1$. To the extent the side of object $O_1$ illuminated by light beam 2 deviates from the above mentioned transverse plane, a lattice of alternately dark and light, parallel bands 3 essentially of the same pitch p as those formed on the plane screen above mentioned will appear on that illuminated side of object $O_1$; however, they are no longer straight because their respective positions are affected by the relief of the illuminated side of object $O_1$ in the manner of contour lines. The source or generator for light beam 1 further comprises means to be specified below to shift by 180° the variations with respect to space, period and intensity of light beam 2 it produces in regard to the transverse direction; such means may be controlled for instance from a double-throw switch $1a$, the activation of which will invert the respective positions of the light and dark bands of the band lattices previously mentioned (3 on object $O_1$), that is, these lattices will shift by $p/2$ in the $x$-direction.

Reference numeral 4 denotes a camera loaded with a photographic plate 5; light beam 6 emanating from object $O_1$ and passing through objective $4a$ of camera 4 projects an image of said object $o_1$ on said plate when, for instance, switch $1a$ of source 1 is in the position of O-degree phase-shift. Upon closing the shutter (not shown) of camera 4, switch $1a$ is turned to the 180° phase shift position and the second object $O_2$ is substituted for the first object $O_1$ with which it is to be compared, so that this second object $O_2$ occupies essentially the same position as object $O_1$ did previously with respect to objective $4a$ of camera 4. This substitution and positioning operation of the second object may be facilitated by using the index marks of the first object: the simplest of such index marks precisely are the alternately dark and light bands 3 caused to appear on the illuminated side of the object by beam 2; however, if the second object is substituted for the first after a shift of $p/2$ of the band lattice, and if for instance the position of the first object was indexed by making one of its details coincide with the edge of a light band, the positioning of the second object $O_2$ must be effected in such manner that there be coincidence between its homologuous detail and the edge of a dark band that was substituted for said light band. When the shutter is then opened a second time, light beam 6 from the second object $O_2$ will therefore together with objective $4a$ form an image of object $O_2$ precisely superposed on plate 5 on that of the previously recorded one of object $O_1$; insufficiently accurate superposition of the images of two absolutely identical objects on the other hand would cause blurred zones likely to be erroneously attributed to differences in shape or dimensions of the two objects.

Figure 2:
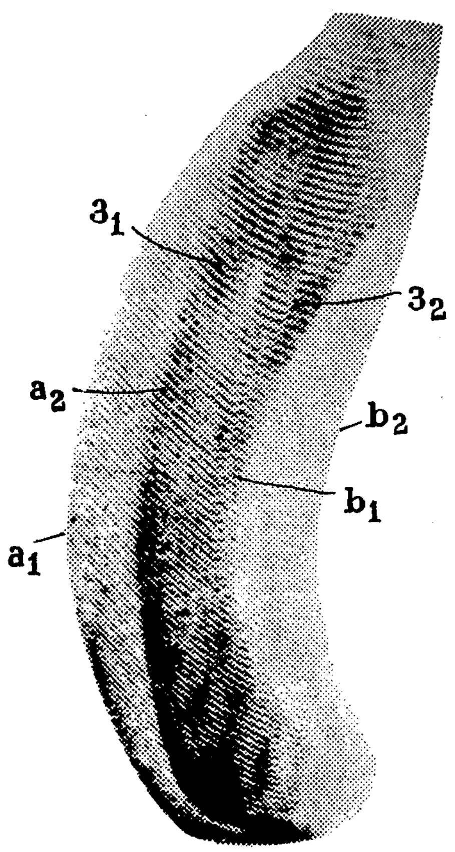
FIGS. 2 and 3 are copies of photographs meant to explain operation of the apparatus of FIG. 1.

When the photographic plate 5 has been twice exposed in this manner, it will be withdrawn from camera 4 and developed by means of apparatus 7. FIG. 2 illustratively shows a photograph obtained from the process stages described so far and in conformity with the invention, object $O_1$ being a rubber eraser slice seen in cross-section and slightly arched, object $O_2$ being the same eraser, also seen in cross-section, but more arched; the references a1 and b1 on one hand, and a2 and b2 on the other, denote the longitudinal sides of arched nature of objects $O_1$ and $O_2$ respectively; the crescent-shaped zones $a1 - a2$ and $b1 - b2$ lacking overlapping of the two superposed images and therefore corresponding to differences in shape of the two objects $O_1$ and $O_2$, appear more clearly than the overlap zone in the middle, $a2 - b1$; however no information at all may be inferred as to the differences in shape and dimensions of this eraser slice, which did arise from its deformation; one may only notice that the two lattices of parallel bands $3_1$ and $3_2$ are not precisely superposed in the median, overlap zone $a2 - b1$, no precise data being available.

If in a plane normal to axis $2a$ of light beam 2 and essentially at the level of the illuminated surface of object $O_1$, and in that plane, one considers the x-axis to be (FIG. 1) parallel to the direction in which there is periodic variation of the intensity of the beam 2, and if further one assumes this variation is sinusoidal and of spatial period $p$, then one will observe that $I_1(x)$, which denotes the intensity distribution function along said x-axis of light beam 6 reflected by said object $O_1$ if illuminated by a light beam of constant intensity, is given in a form expressing the exposure distribution of photo plate 5 along the straight line parallel to the x-axis, i.e., $$I_1(x)\,[1 + \cos 2\pi/P\,X]. \quad (1)$$

As regards object $O_2$, on the other hand, the distribution function $I_2(X)$ may locally differ from $I_1(x)$ and the exposure distribution along the same straight line of the image of object $O_2$ on plate 5 is given by $$I_2(x)\,[1 + \cos 2\pi/P\,(x + P/2)] = I_2(x)\,[1 - \cos 2\pi x/P] \quad (2)$$

Therefore, following developing, the amplitude transmission of photo plate 5 will therefore vary, within a constant of proportionality, and along the straight line under consideration, as $$\tau(x) = I_1(x) + I_2(x) + \cos 2\pi\,x/P\,[I_1(x) - I_2(x)] \quad (3)$$

The superposed image appearing on the developed plate 5*a* may therefore be considered as the resultant of the superposition of an additive image independent of the spatial period $p$ and of a subtractive image the density of which is modulated by a sinusoidal function of argument $(2\pi x/p)$.

Figure 1:
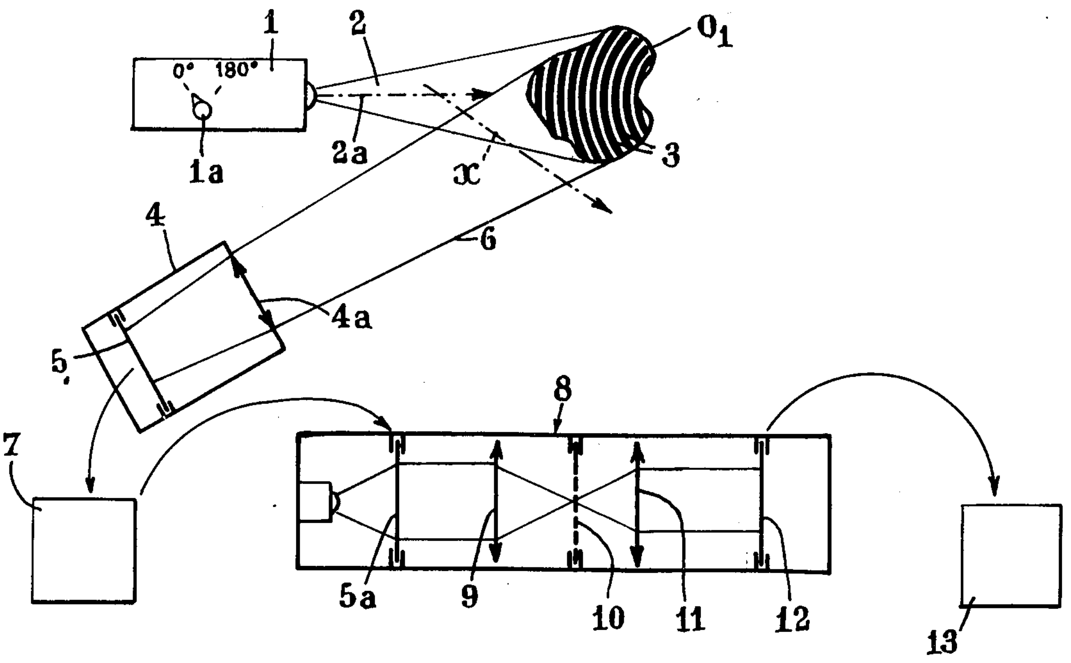
FIG. 1 shows a first embodiment in schematic form.

The developed photo plate 5*a* then is inserted into a photographic reproduction apparatus denoted by 8 in FIG. 1 and which may be of a known type; there is no need therefore to describe it in detail with respect to all of its components; it will suffice to indicate it comprises known means, notably at least one lens 9, for transforming the optical image of the developed plate 5*a* in a plane with a spatial filtering mask or stop 10. Latter is known per se and made to transmit exclusively the differential component of said optic image, which is modulated with a spatial frequency $1/p$; it is known that the optic image formed by lens 9 is the Fourier transform of the two-dimensional amplitude transmission of the developed plate 5*a*, and that the components of this spatial distribution corresponding to different spatial frequencies will be formed at different points in said plane, so that they may be filtered spatially by means of a suitable mask or stop 10.

The image formed by a second lens 11 behind stop 10 on an unexposed photo plate 12 therefore corresponds only to the differential component modulated at the spatial frequency $1/p$, which alone was transmitted by the filtering stop 10; this second photo plate 12 then will be developed by means of apparatus 13.

Figure 3:
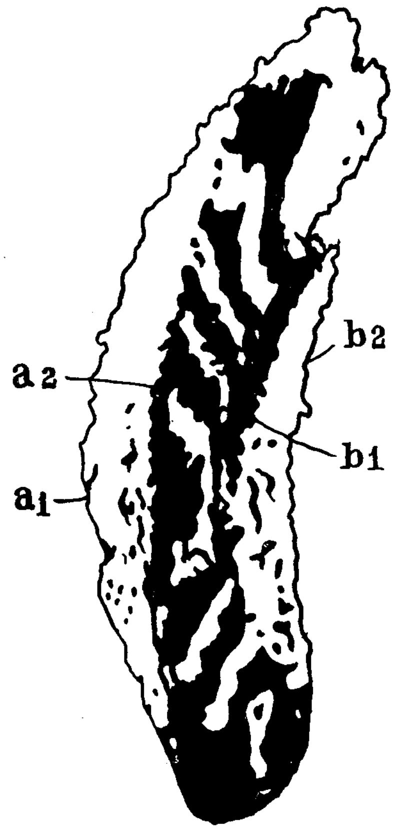

FIG. 3 shows in schematic form the photograph obtained in the reproduction device equipped with optical filter 8 as described above and based on the photograph shown in FIG. 2 and previously described. The two crescent-shaped zones *a*1 – *a*2 and *b*1 – *b*2 corresponding to differences in shape of the two objects in a plane essentially normal to axis 2*a* of beam 2 appear with almost uniform exposure, whereas the moire patterns in the median overlap zone *a*2 – *b*1, which are due to the superposition of two fringe lattices with slight local shifts, show alternately dark and light bands of fairly irregular shapes and contours; one may infer therefrom the shape variations of the eraser slice due to its deformation.

The embodiment of the apparatus of the present invention illustrated in FIG. 1 and that was described just above may be varied as follows: in lieu of providing a single light beam source for the consecutive illumination of the objects being compared in the manner described above, two independent analog sources may be provided allowing simultaneous illumination of the two object $O_1$ and $O_2$ - now assumed different - respectively by means of two light beams of which the respective intensity variations in the transverse x-direction will be 180° out of phase (FIG. 1). In this instance, optical means such as mirrors and beamsplitter must be provided in order to superpose the two light beams emanating from each of the objects at the entrance of the camera objective; this kind of embodiment however is less advantageous than the one illustrated by FIG. 1 to the extent it will require additional and fairly complex means for positioning the two objects being compared with respect to the photo objective and in such manner that their images will precisely superpose on the photo plate.

FIG. 4 shows in schematic form an embodiment mode of the light beam source 1 of FIG. 1 in the area enclosed by dashed lines. In this embodiment, reference numeral 14 denotes a monochromatic light source with a wavelength λ; this may be a natural light source or else a coherent light source such as a laser; it generates a collimated beam 15 which is split by a semireflecting mirror 16 into a transmitted beam 15*a* and a reflected one 15*b*; latter is again reflected by a second mirror 17, and the two collimated beams 15*a* and 15*b* thereupon will pass through a lens 18 to converge in its focal plane at two points 20*a* and 20*b*, which constitute two point sources separated by a distance d and each generating two divergent beams of monochromatic light, 21*a* and 21*b*, which are coherent with respect to each other. The double coherent beam 21*a*,21*b* superposition zone is shown shaded in FIG. 4 and constitutes their interference field, corresponding to a light beam 2 of which the intensity varies periodically in the x-direction and parallel to the focal plane 19 of lens while normal to the axis 2*a* of said beam 2 (this axis 2*a* coincides with that of lens 18 in the instance of the arrangement shown in FIG. 4).

For a given distance of object $O_1$ from the focal plane 19 of lens 18, the pitch p of the interference fringes appearing on the surface illuminated by beam 2 depends only on the wavelength λ of the monochromatic light generated by source 14 and on the distance *d* between the two point sources 20*a* and 20*b*; said distance *d* for the embodiment of FIG. 4 and for a given focal length of lens 18 only being a function of the angle θ subtended between the initial light beam 15 and axis 2*a* of the system, it will be quite easy to vary the distance *d* and hence the pitch p of the fringes mentioned so as to adjust it optimally to the fineness of the superficial details of object $O_1$.

Reference numeral 22 in FIG. 4 denotes a glass plate, or a plate of any other transparent material intercepting one of the two beams 15*a* and 15*b*, and, as regards the case being illustrated, especially the reflected beam 15*b*; the plate thickness is so chosen that, allowance being made for the constituent index of refraction, the path of light beam 15*b* will be increased by an odd multiple of λ/2, and the plate is mounted in movable manner, for instance translationally, when controlled from a displacement component such as switch 1a of FIG. 1, so that said plate may be placed at will in the path of light beam 15*b*. Plate 22 also may be mounted in rotatable manner so as to allow adjusting the angle of incidence of beam 15*b* on the entrance side of the plate and therefore so as to allow adjusting the length of transparent material being tranversed by said beam 15*b;* provision for the latter allows utilizing a plate 22 of which the tolerance regarding thickness is much larger than $\lambda/2$. In this instance, achieving out-of-phase shifting of light beam 15*b* with respect to light beam 15*a* by an amount exactly equal to an odd multiple of $\lambda/2$ requires control by means of apparatus comprising a photoelectric detector 23 of which the entrance window width 23*a* is of the order of pitch p of the interference fringes, further comprising means 24 and 25 for the amplification and the measurement resp. of the output current; photoelectric detector 23 is located near object $O_1$ in beam 2 so that - for instance - its output current by a minimum when plate 22 is not intercepting beam 15*b;* in this case, once said plate 22 has been interposed in beam 15*b*, the inclination of said rotating plate must be so adjusted that the output current of photoelectric detector 23 becomes a maximum.

In a variation, means are provided for polarizing the two light beams 21*a* and 21*b;* this may be done either by using a polarized light source 14 or by interposing at least one polarizer in the path of the various light beams, as shown in FIG. 4; on the other hand a phase-shifter, especially one made of a birefringent material and of such dimensions as to cause a shift of 180°, is so located as to intercept one of light beams 15*a*,15*b* or 21*a*,21*b*. This phase-shifter for instance may be a birefringent half-wave plate.

Light beam source 1 shown in FIG. 4 may be part of the variation shown in highly schematic form in FIG. 5; a third point source 20*c* is located in a plane normal to axis 2*a* of the system and at the third apex of a right triangle formed with the other two point sources 20*a* and 20*b*, source 20c forming a third divergent light beam which is coherent with those from sources 20*a* and 20*b;* this may be achieved for instance by adding a semireflecting mirror similar to 16 and a second mirror similar to 17 to the source 1 in FIG. 4 so as to project a third collimated beam 15*c* (not shown) on lens 18; polarizers furthermore are placed in the paths of the three light beams generated by the three point sources 20*a*,20*b* and 20*c*, which will cause linear polarizations as indicated by the arrows P*a*, P*b* and P*c* in FIG. 4; these polarizers are so adjusted that, the three polarizations P*a* through P*c* being in the same plane as the right triangle with the three point sources 20*a* through 20*c* at its apexes, the polarizations P*a* and P*c* will be normal to each other, whereas P*b* is normal neither to P*a* nor to P*c*, but preferably at 45° with respect to them; therefore interference may only take place between, on one hand, P*a* and P*c*, and on the other, the P*b* components, in the respective directions of P*a* and P*c*, so that two fringe lattices will appear on a screen 26 located normally to axis 2*a* in the interference field of the three diverging light beams generated by the three point sources 20*a* through 20*c*, and especially by fringes 27*a* which are normal to the projection on screen 26 of the side 20*a*–20*b* of the right triangle, and fringes 27*c* which are normal to the projection on the screen of side 20*b*–20*c* of said triangle, these two fringe lattices therefore being normal to each other. Thus, a source of this kind will generate a light beam with an intensity periodically variable in the two orthogonal *x*- and *y*-directions which are normal to axis 2*a* of said beam, and with spatial periods that may differ if the two point sources 20*a* and 20*c* are not equidistant from point source 20*b*. It should be understood that such a beam causes to appear on the illuminated side of the object a two-dimensional network or lattice of alternately dark and light spots, of which the relative positions and shapes are affected by the surface relief of the object. Means such as previously described may also be provided to arbitrarily cause 180° phase shifts in the light beam obtained from source 20*b*.

The light beam source(s) of the apparatus of the present invention also lend themselves to an embodiment comprising a source in the beam of which one places a screen or grid in perpendicular manner, such grid consisting of thin opaque wires or threads, or else of a one-dimensional or two-dimensional optical network modulating said beam in one or two transverse directions, there being one or two spatial periods depending on the pitch or denier of the grid, screen or network, and further comprising an objective for projecting an image of the grid, screen or network on the ojbect being illuminated.

By allowing the gird, screen or optic network to shift parallel to its own plane from a first to a second position in which latter its opaque elements are at the site of the transparent ones in the former, the periodic spatial intensity variations of the transmitted light beam may be shifted by 180°.

The embodiment of the apparatus of the present invention shown in FIG. 6 differs from that shown in FIG. 1 only in that light beam 6 - which is reflected from object $O_1$ illuminated by light source 1 - is picked up by objective 28*a* of a TV camera 28, latter being of any suitable type, its video signals being transmitted via line 29 to the movable part 30 of a double throw switch, 31 and 32; contact 31 is connected to input 33*a* of a memory 33 which will store the totality of the video signals from camera 28, these corresponding to a complete image. Contact 32 of switch 30 is connected to the first input 34*a* of an adder circuit 34, of which the second input 34*b* is connected to output 33*b* of memory 33; output 34*c* of adder circuit 34 is connected by line 35*a* to the video input of a video visual display device 36 of known type and comprising a cathode-ray tube with a screen referenced as 36*a*, passing through an electric filter 35 with a suitable pass-band which preferably may be adjusted as to width and central frequency; latter will be set to be essentially equal to $v/p$, where $v$ is the linear sweep speed of camera 28.

Switch 1*a* of the light beam source 1 being in its 0° position, and switch 30 making contact with its pole 31, the video signals of the image of object $O_1$ picked up by camera 28 will be applied to input 33*a* of memory 33, which may be any suitable model, for instance an electronic storage tube or a circulating memory; proper operation of a memory of this kind requires synchronizing it with the sweep of camera 28; this is shown in FIG. 6 by line 37 transmitting the sweep synchronization signals of camera 28 to a synchronization input 33*c* of memory 33.

Next, switch 1a of source 1 will be placed in its 180° position and switch 30 will make contact with pole 32, while object $O_2$ replaces object $O_1$ in the manner previously described. The following video signals from camera 28 and corresponding to the image of object $O_2$ are applied to the first input 34*a* of adder circuit 34, of which the second input 34*b* receives the previously stored video signals from memory 33 and emitted at latter's output 33*b*, this operation occurring in synchronism with the analysis of object $O_2$ on account of the transmission of the synchronizing signals from camera 28 via line 37 to input 33*c* of said memory 33. Video signals corresponding to the super-position of the respective images from objects $O_1$ and $O_2$ and successively picked up by camera 28 will therefore appear at the output 34*c* of adder circuit 34, these super-posed video signals being transmitted to the input of filter 35, of which the output will only transmit via line 35*a* the components modulated by the time frequency $v/p$ to the video input of the visual display device 36. Latter's operation being synchronous with camera 28 on account of the synchronizing sweep signals emitted by said camera and received via line 38 extending line 37, a differential image spatially modulated at a frequency equal or proportional to $1/p$ - depending on the linear sweep speed of screen 36*a* of the cathode ray tube being equal or proportional to the linear sweep speed v of camera 28 - will appear on screen 36*a* of said visual device 36.

If the light beam source 1 comprises means allowing to vary the pitch or denier *p* of fringes 3, filter 35 must be so designed as to allow setting the center frequency of its bandpass that it will always remain equal to $v/p$; clearly some coupling may be provided for these two settings.

The embodiment shown in FIG. 6 and described above is particularly well suited for consecutively comparing a large number of objects with a constant, first one serving as standard and of which the electrical image is permanently stored in memory 33, which is such as to allow reading without erasure, or else is provided with immediate restoring; such a device allows among others real time control and monitoring of production line processes.

The embodiment of FIG. 6 allows a variation which was not shown and which comprises two light beam sources for the simultaneous illumination of two objects being compared, two TV cameras with synchronized sweeps and identical linear sweep speeds *v* and so positioned as to pick up each only one of the illuminated objects and to allow super-position of the images on a visual display device, further comprising means for adding the electric video signals from the two cameras and to obtain from their sum and by means of filtering the components modulated at a time-frequency $v/p$, said components alone being transmitted as a video signal to said visualization display.

I claim:

1. A method for comparing two three-dimensional objects having similar shapes and dimensions which comprises:

illuminating a side of one of the objects by a collimated light beam whose intensity is modulated in a direction transverse thereto at a spatial frequency of $1/p$, said modulated light beam generating on the illuminated side of the object a lattice of alternately dark and light parallel bands similar to interference fringes having a configuration in the manner of contour lines determined by the relief of the illuminated side of the object and pitch *p*, similarly illuminating the other object but wherein the intensity modulation is phase-shifted by 180°, optically superimposing images of the illuminated sides of the two objects, and obtaining from the superimposed images the differential component thereof which is modulated at the spatial frequency $1/p$.

2. The method as defined in claim 1 for comparing two three-dimensional objects having similar shapes and dimensions wherein a single light beam is utilized which illuminates the two objects in succession and wherein the image of the first one of the objects to be illuminated is stored until the image of the second object to be illuminated has been obtained.

3. Apparatus for comparing two three-dimensional objects having similar shapes and dimensions which comprises:

means for illuminating a side of one of the objects by a collimated light beam whose intensity is modulated in a direction transverse thereto at a spatial frequency of $1/p$, said modulated light beam generating on the illuminated side of the object a lattice of alternately dark and light parallel bands similar to interference fringes having a pitch p and a configuration in the manner of contour lines determined by the relief of the illuminated side of the object, means for similarly illuminating the same side of the other object and wherein the intensity modulation of the light beam in phase-shifted by 180°, means for superimposing images of the illuminated side of the two objects, means including a filter for obtaining from the superimposed images the differential component thereof which is modulated at the spatial frequency $1/p$, and means for displaying said differential component.

4. Apparatus as defined in claim 3 for comparing two three-dimensional objects having similar shapes and dimensions wherein said means for illuminating a side of the object comprises at least one source of a collimated light beam whose intensity is modulated along at least one direction transverse thereto and the phase of which can be shifted by 180°.

5. Apparatus as defined in claim 3 for comparing two three-dimensional objects having similar shapes and dimensions wherein said means for superimposing images of the illuminated side of the two objects comprises a TV camera having a linear sweep speed v, and means for indexing the position of a first one of the objects with respect to the objective of the TV camera and for the ensuing positioning of the other object at precisely the same location as said first object, wherein said means for obtaining the differential component from the superimposed images comprises means for storing the video signals obtained from said TV camera when picking up the illuminated side of said first object, means for adding the stored video signals to those produced by said TV camera when picking up the illuminated side of said other object, and a filter connected to the output of said adding means, said filter having a pass band the central frequency of which is substantially equal to $v/p$, said means for displaying the said differential component being connected to the output of said filter.

* * * * *